United States Patent [19]
Kayes

[11] Patent Number: 5,480,263
[45] Date of Patent: Jan. 2, 1996

[54] SOIL DISPLACEMENT HAMMER FOR REPLACING UNDERGROUND PIPES

[75] Inventor: Allan G. Kayes, Sittingbourne, United Kingdom

[73] Assignee: Powermole International Limited, Sittingbourne, England

[21] Appl. No.: 256,318

[22] PCT Filed: Dec. 30, 1992

[86] PCT No.: PCT/GB92/02407

§ 371 Date: Sep. 14, 1994

§ 102(e) Date: Sep. 14, 1994

[87] PCT Pub. No.: WO93/13351

PCT Pub. Date: Jul. 8, 1993

[30] Foreign Application Priority Data

Dec. 31, 1991 [GB] United Kingdom .................. 9127525

[51] Int. Cl.⁶ ................................................ F16L 55/18
[52] U.S. Cl. ............................ 405/154; 405/184; 138/97
[58] Field of Search .................................... 405/154, 156, 405/184; 166/55.2; 138/97

[56] References Cited

U.S. PATENT DOCUMENTS

| 4,648,746 | 3/1987 | Abinett ................................ 405/154 X |
| 4,657,436 | 4/1987 | Yarnell ................................ 405/156 X |
| 4,738,565 | 4/1988 | Streatfield et al. ...................... 405/154 |
| 4,848,964 | 7/1989 | Yarnell ................................ 405/156 X |
| 5,054,677 | 10/1991 | Carruthers ............................ 138/97 X |
| 5,112,158 | 5/1992 | McConnell ............................. 405/154 |

*Primary Examiner*—Ramon S. Britts
*Assistant Examiner*—Frederick L. Lagman
*Attorney, Agent, or Firm*—Darby & Darby

[57] ABSTRACT

A mole is provided for use in replacing or preparing for replacement an existing underground pipe. The mole is sized to permit insertion into and movement along the existing pipe. The mole is provided with a front portion having a cutting edge for engaging the internal wall of the existing pipe and to fracture the same. The rear portion of the mole clamps to a new pipe or a liner for the existing pipe. Accordingly, The mole is adapted to tow the new pipe or the liner through the fractured pipe. The head portion of the mole is tapered toward the front and has flat or scalloped sides defining therebetween integral cutting edges.

6 Claims, 1 Drawing Sheet

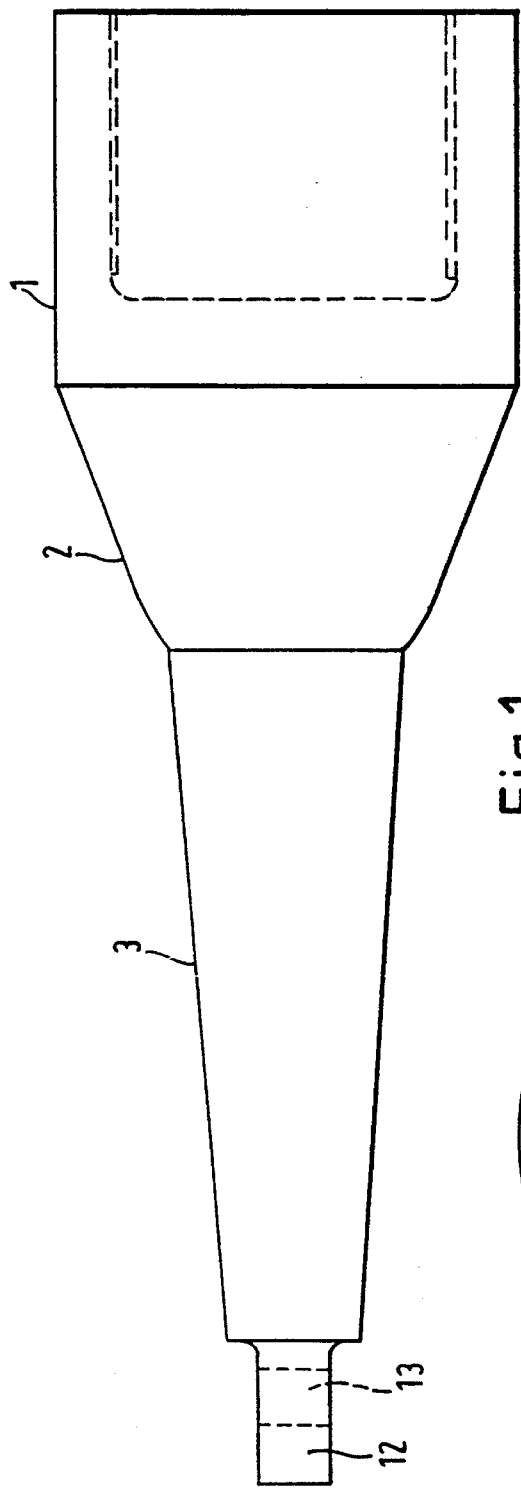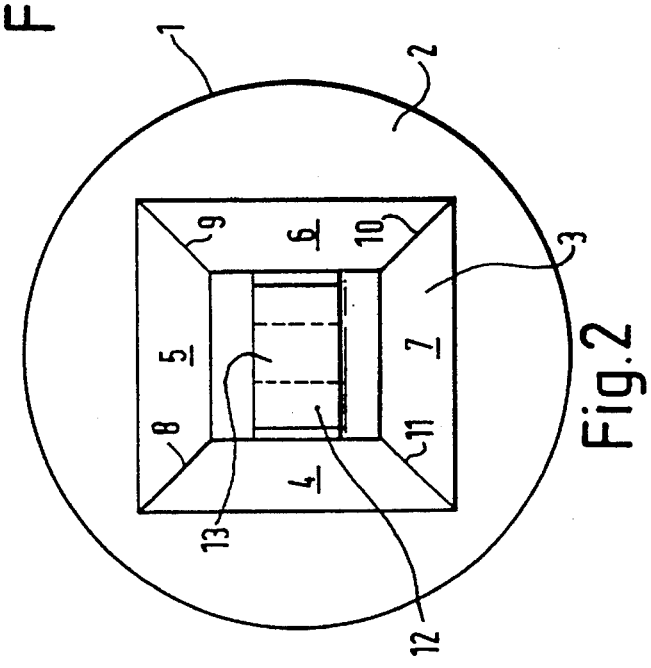

SOIL DISPLACEMENT HAMMER FOR REPLACING UNDERGROUND PIPES

This invention relates to a soil displacement hammer for use in replacing underground pipes, such as gas mains or sewers.

Soil displacement hammers, commonly referred to as "moles", are impact-action self-propelled mechanisms for driving holes in the ground. They are generally pneumatically operated, although hydraulic, electric and other driving means are possible. They can be used to install pipes, cables or conduits in the ground without the necessity for excavating a continuous trench. Such moles are disclosed, for example, in GB-A-2 134 152 and GB-A-2 147 035.

The use of a mole in replacing underground pipes is described in GB-A-2 092 701. The mole is designed to pass through an existing underground pipe, and is provided with cutting edges at the front so as to cause the walls of the pipe to fracture as the mole moves therealong. A new pipe, or a liner therefor, is towed along behind the mole. The mole is driven through the pipe, for example by means of compressed air, in conventional manner, and is simultaneously guided and pulled along the pipe by a winch cable attached to the front of the mole.

The mole described in GB-A-2 092 701 is provided with fixed or moveable blades at its front to cause fracture of the existing pipe. However, such blades are not very effective, and particular problems are caused in fracturing thick flanges which are present at the joints between adjoining lengths of pipe. The blades have a high wear and fracture rate.

The present invention unexpectedly overcomes this problem by employing a mole in which the cutting edges are integral with the head. This solution is particularly unexpected because up to now, all moles have been provided with smoothly curved or frusto-conical heads. Indeed, in normal practice, a mole having a head portion with sharp edges would not be desirable, because it would be directionally unstable when passing through the ground.

The present invention thus provides a mole for use in replacing or preparing for replacement an existing underground pipe, the mole being adapted for insertion into and movement along the existing pipe, and having a front portion provided with a cutting face for engaging the internal wall of the existing pipe and arranged to cause the wall to fracture, and a rear portion provided with means for clamping to the mole a new pipe or a liner for the existing pipe, so that the mole can tow the new pipe or the liner through the fractured pipe as the mole moves therethrough, characterised in that a head portion of the mole is tapered towards the front and has flat or scalloped sides defining therebetween integral cutting edges, the angle of taper being from 2° to 10° and the number of cutting edges being from 3 to 8.

The angle of taper is preferably from 4° to 6°. The number of cutting edges is preferably from 3 to 6, in particular 4, and the tapered sides are preferably flat. Most preferably, the head portion of the mole is of tapered square section.

Reference is now made to the accompanying drawings, in which:

FIG. 1 is a side view of the front portion of a mole according to a preferred embodiment of the invention; and FIG. 2 is a front view of the mole shown in FIG. 1.

Referring now to the drawings, the body of the mole comprises a cylindrical outer casing 1. The internal structure and pneumatic operation of the mole are conventional, and are therefore not described here. The rear end of the mole (not shown) includes means for clamping a new pipe or liner for towing behind the mole as it passes along the pipe to be replaced.

Immediately in front of the cylindrical casing 1, there is a frusto-conical portion 2, having an angle of taper of 20°. Immediately in front of the frusto-conical section 2, there is a head portion 3 of square tapered section. The head portion 3 thus comprises four flat sides 4, 5, 6, 7, which define therebetween four straight cutting edges 8, 9, 10, 11 which are in the axial plane of the mole. The angle of taper of the head portion 3 is 4°.

Attached to the front of the head portion 3 there is a projecting portion 12, which incorporates a hole 13 for engagement with a winch cable.

The method of use of the mole is similar to that described in GB-A-2 092 701. The mole passes through an existing pipe under its own pneumatic power and under guidance and assistance from a winch cable attached to the front. As it passes through the pipe, the cutting edges on the head portion cause the pipe to fracture. A new pipe or a liner is towed along behind the mole.

Because the head portion 3 is solid, with integral cutting edges, it is most effective in fracturing the old pipe and very little wear of the head portion occurs. Although four cutting edges are preferred, it is possible to have three or more than four. Particularly where more than four cutting edges are employed, it may be desirable to scallop the tapering surfaces in between the cutting edges so as to sharpen the cutting angle at these edges.

A particular advantage of the cutting head used in the present invention is that there is no need for separate cutting blades, and in particular, there is no need for the moveable blades of the kind described in GB-A-2 092 701. The latter moveable blades are operated under hydraulic pressure which requires a hydraulic hose connection to the front of the mole. Such a connection gives rise to practical problems and is expensive, and it is therefore a particular advantage of the present invention to render such means unnecessary.

I claim:

1. A mole for use in replacing or preparing for replacement an existing underground pipe, said mole being adapted for insertion into and movement along the existing pipe, and having a front portion provided with a cutting face for engaging the internal wall of the existing pipe and arranged to cause the wall to fracture, and a rear portion provided with means for clamping to said mole a new pipe or a liner for said existing pipe, so that said mole can tow the new pipe or the liner through the fractured pipe as said mole moves therethrough, wherein a head portion of said mole is tapered towards the front and has a flat or scalloped sides defining therebetween integral cutting edges, the angle of taper being from 2° to 10° and the number of cutting edges being from 3 to 8.

2. A mole according to claim 1, wherein the angle of taper is from 4° to 6°.

3. A mole according to claim 1, wherein the number of cutting edges is from 3 to 6.

4. A mole according to claim 3, wherein the number of cutting edges is 4.

5. A mole according to claim 1, wherein the tapered sides are flat.

6. A mole according to claim 1, wherein the head portion of the mole is of tapered square section.

* * * * *